April 29, 1924.

K. KIEFER 1,491,804

MACHINE FOR APPLYING SCREW CLOSURES TO CONTAINERS

Original Filed March 1, 1920  2 Sheets-Sheet 1

WITNESSES.

INVENTOR.

April 29, 1924.

K. KIEFER 1,491,804

MACHINE FOR APPLYING SCREW CLOSURES TO CONTAINERS

Original Filed March 1, 1920    2 Sheets-Sheet 2

WITNESSES.

INVENTOR.

Karl Kiefer

Patented Apr. 29, 1924.

1,491,804

UNITED STATES PATENT OFFICE.

KARL KIEFER, OF CINCINNATI, OHIO.

MACHINE FOR APPLYING SCREW CLOSURES TO CONTAINERS.

Application filed March 1, 1920, Serial No. 362,571. Renewed March 17, 1924.

*To all whom it may concern:*

Be it known that I, KARL KIEFER, a citizen of the United States, and a resident of Cincinnati, in the county of Hamilton and State of Ohio, have invented certain new and useful Improvements in Machines for Applying Screw Closures to Containers, of which the following is a specification.

My invention relates to a machine for screwing so-called screw caps on glass jars that have threads of glass formed on the upper part of the mouth to engage with the screw threads of the cap, and its purpose is to devise means whereby the cap is screwed tight enough but not too tight, by means of regulating the pressure.

It also comprises novel means for taking hold and engaging the cap, and other means of doing this work in a more simple and efficient manner. In the drawings.

Figure 1:
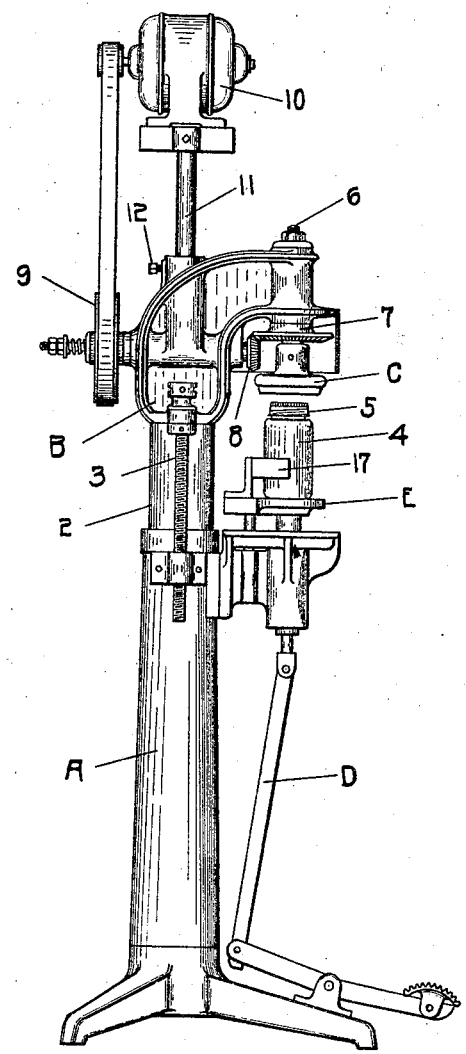
Fig. 1 shows the assembly of such a machine in side elevation.

In Fig. 1, A is a hollow column mounted on a tripod, and B is the head frame adjustably movable up and down inside of the hollow column held there by its cylindrical part 2, and adjusted by screw 3 for the different heights of bottles. On the table E is shown a glass jar 4, and the cap 5, which is shown in the drawing to be loosely placed on the jar.

The chuck C is mounted on the shaft 6, which is movable in the head frame B. On the same shaft 6 is the bevel gear 7 driven by the bevel gear 8 of a horizontal shaft connected to pulley 9, which is driven by a belt or other means from the electric motor 10. To tighten the belt, this motor is adjustable by means of the column 11 in the head frame B, and the set screw 12 fastens it in any position.

Figure 4:
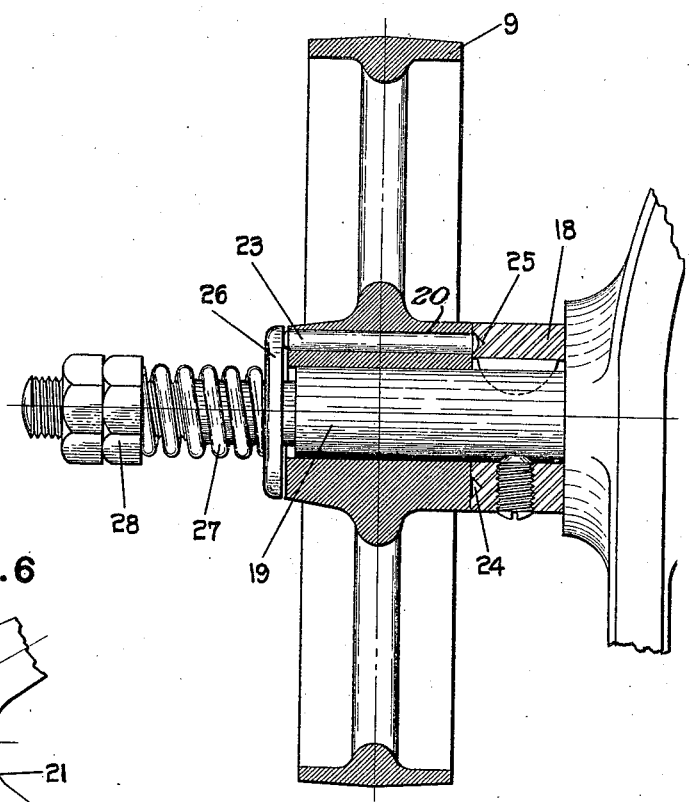
Fig. 4 shows a cross section through the mechanism which releases the chuck when the pressure is sufficiently great.
Figure 5:
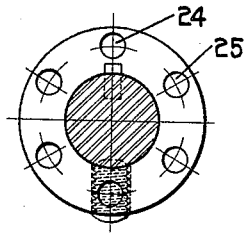
Fig. 5 is a cross-section showing the ring on the shaft.
Figure 6:
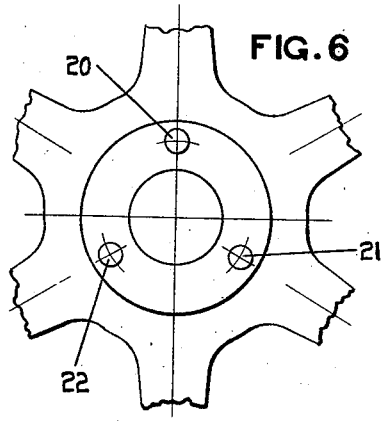
Fig. 6 is a partial front view of the pulley.

My improved chuck has no movable parts. It is shown in cross section in Fig. 2. It takes hold by friction upon the edge of the screw cap. Its lower mouth is cone shaped similar to the cone shape of friction pulleys or friction clutches. When the jar is raised by means of the treadle mechanism D and the table E, the cap is forced on, the friction of the chuck being great enough to screw any cap tight against the glass jar. However, to prevent screwing on the cover too tight and perhaps breaking the glass, the vertical shaft 6 which carries this chuck is not rigidly connected to the motor or power drive, but it is connected by a sort of friction mechanism which is shown in Figs. 4, 5 and 6, and it consists mainly of a steel ring 18 which is rigidly connected by means of a key and a screw to the horizontal driving shaft 19 that carries the bevel gear 8. The pulley 9 rotates loosely on this driving shaft 19, and this pulley has a plurality of holes 20, 21 and 22 drilled in its hub parallel with its axis, in which steel pins 23 of Fig. 4 are slidable in the direction of the axis of the pulley.

A number of depressions or cavities 24 and 25 are in the rear face of the steel ring 18, and the steel pins are pressed into these depressions by means of washer 26, spiral spring 27 and lock nut 28 on a rear extension of the shaft 19. The action of this device is to press these steel pins 23 into the cavities with a predetermined force which can be regulated by the lock nut 28, thereby flexibly connecting pulley 9 to the driving shaft 19. As will be seen, it would take a certain power to lift the pins 23 from the cavities 24 and 25, because the spring 27 opposes this lifting. This power is so regulated that it corresponds to the twisting effect that is to be given by the chuck C to the cap of the glass jar.

It is preferable that a plurality of depressions should be in the ring 18, so as to let the pins 23 quickly find these depressions, after they have been lifted out of them by proper action of this device, so as to produce the same twisting effect for the subsequent cap without delay.

The vertical pressure of the chuck helps to compress any gasket such as is commonly used with the screw cap, which gasket may be of cork, paper or rubber.

Figure 2:
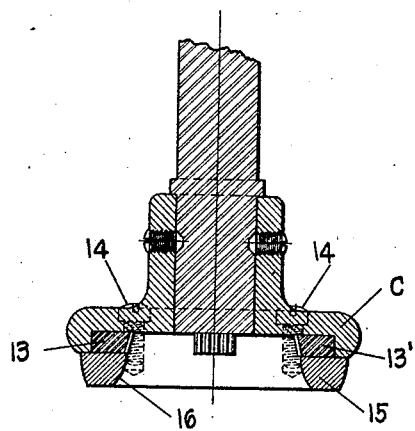
Fig. 2 shows a cross section of the chuck which is to engage the screw cap.
Figure 3:
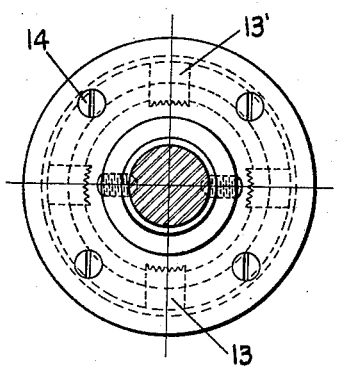
Fig. 3 shows a top view of the chuck.

In order to increase the friction on the cap, part of the cone surfaces of the chuck can be replaced by hardened steel jaws 13 and 13′, with their inner ends inclined radially outward toward the entrance, and having teeth therealong, two of them shown in section, Fig. 2, and by dotted lines, Fig. 3. These steel jaws are held by making the chuck C in two parts, clamping these jaws between the parts by means of screws 14 shown in Fig. 2 and Fig. 3. The lower ring 15 is recessed for this purpose to receive these jaws and prevent their rotation relatively to the chuck. The mouth 16 is flared more than the more inward parts of the walls to facilitate easy centering of these screw caps when moved upward by the treadle mechanism.

In order to center the glass jar a back guide 17 is provided, which may be adjustable for different dimensions of jars. This back guide may be made of frictional material, and in operation the glass jar is pressed against it by the operator, and the friction prevents the glass from rotating until the cap is screwed sufficiently tight on the glass jar.

If the screw caps are of approximately the same diameter with little variation, the same chuck C can serve for the different sizes of caps. If the variation is too great then different chucks must be inserted into the machine.

Having described my invention, what I claim and desire to secure by Letters Patent is:

1. In a machine for applying screw closures to containers, a rotatable head having a conical downwardly opening socket with rigid walls immovable relatively to said head during rotation of the head, to wedge around a screw cap and rotate the cap on a container, and a removable jaw rigidly secured in said head to additionally wedge against the closure.

2. In a machine for applying screw closures to containers, a rotatable head having a conical downwardly opening socket with rigid walls immovable relatively to said head during rotation of the head, to wedge around a screw cap and rotate the cap on a container, and a series of radially arranged removable jaws rigidly secured in said head to additionally wedge around the closure.

3. In a machine for applying screw closures to containers, a rotatable head having a conical downwardly opening socket with rigid walls immovable relatively to said head during rotation of the head, to wedge around a screw cap and rotate the cap on the container, and a removable jaw rigidly secured in said head so as to be non-rotatable relatively to said head, inwardly of said socket past said rigid walls, to additionally wedge against the closure.

4. In a machine for applying screw closures to containers, a rotatable head comprising a chuck part, a ring part fitting on said chuck part, one of said parts having a recess, a jaw held in said recess, engaged by the walls of the recess so as to be immovable relatively to the head during rotation of the head, and having an engaging surface presented radially inwardly of said head, the inner surface of said ring part being inclined to form a conical socket leading to said engaging surface of said jaw, and means rigidly securing the ring part to the chuck part.

KARL KIEFER.

Witnesses:
E. E. FINCH,
M. A. HARRINGTON.